US012781556B2

(12) United States Patent
Janser et al.

(10) Patent No.: US 12,781,556 B2
(45) Date of Patent: Nov. 3, 2026

(54) ASSEMBLY FOR GUIDING AT LEAST ONE MOVABLE FURNITURE PART RELATIVE TO A FURNITURE BODY

(71) Applicant: Julius Blum GmbH, Hoechst (AT)

(72) Inventors: Pascal Janser, Hoechst (AT); Stefan Duer, Schwarzach (AT); Andreas Hagen, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 44 days.

(21) Appl. No.: 18/929,127

(22) Filed: Oct. 28, 2024

(65) Prior Publication Data

US 2025/0052102 A1 Feb. 13, 2025

Related U.S. Application Data

(63) Continuation of application No. PCT/AT2023/060115, filed on Apr. 5, 2023.

(30) Foreign Application Priority Data

Apr. 29, 2022 (AT) .................................. 50295/2022

(51) Int. Cl.
*E05D 15/58* (2006.01)
*E05D 15/26* (2006.01)
*E05F 1/16* (2006.01)

(52) U.S. Cl.
CPC ........... *E05D 15/58* (2013.01); *E05D 15/264* (2013.01); *E05F 1/16* (2013.01); *E05Y 2900/20* (2013.01)

(58) Field of Classification Search
CPC .......... E05D 15/58; E05D 15/264; E05F 1/16; E05Y 2900/20; E05Y 2900/212; E06B 3/5045
See application file for complete search history.

(56) References Cited

U.S. PATENT DOCUMENTS 4,729,612 A * 3/1988 Stone .................... E06B 3/5045 312/109
4,974,912 A * 12/1990 Rask .................... E06B 3/5045 312/331

(Continued)

FOREIGN PATENT DOCUMENTS

AT 524635 7/2022
DE 10 2014 103 074 9/2015

(Continued)

OTHER PUBLICATIONS

International Search Report issued Jun. 19, 2023 in International (PCT) Application No. PCT/AT2023/060115.

*Primary Examiner* — Justin B Rephann
(74) *Attorney, Agent, or Firm* — Wenderoth, Lind & Ponack, L.L.P.

(57) ABSTRACT

An assembly for guiding a movable furniture part relative to a furniture body includes a guide system to be fastened to the furniture body, a support on which the movable furniture part is to be mounted and by which the movable furniture part can be moved relative to the guide system between a retracted position and an extended position, a drive device by which the support can be moved relative to the guide system and which has a cable, the cable having a coupling element, and a coupling device for coupling to the coupling element. The coupling element is arranged on and/or in the guide system in order to automatically couple to the coupling device.

41 Claims, 11 Drawing Sheets

(56) References Cited

U.S. PATENT DOCUMENTS

| | | | | |
|---|---|---|---|---|
| 4,976,502 | A * | 12/1990 | Kelley | A47B 87/007 312/331 |
| 5,078,461 | A * | 1/1992 | Beck | A47B 83/001 312/331 |
| 5,395,165 | A * | 3/1995 | Woerner | E05D 15/58 211/27 |
| 6,994,410 | B2 * | 2/2006 | Hogan | E05D 15/58 312/110 |
| 8,231,187 | B2 * | 7/2012 | Hoffman | E05D 15/58 16/382 |
| 10,753,133 | B2 * | 8/2020 | Kohlweiss | E05F 1/1041 |
| 11,428,034 | B2 | 8/2022 | Rupp et al. | |
| 11,503,909 | B2 | 11/2022 | Clarke et al. | |
| 11,828,096 | B2 * | 11/2023 | Koenig | E05F 5/003 |
| 11,946,301 | B2 * | 4/2024 | Irgang | E05D 15/58 |
| 11,952,816 | B2 | 4/2024 | Hoffmann | |
| 2017/0241178 | A1 | 8/2017 | Gabl | |
| 2019/0284859 | A1 * | 9/2019 | Rupp | E05F 3/20 |
| 2019/0301216 | A1 * | 10/2019 | Rupp | E05D 15/26 |
| 2019/0301218 | A1 | 10/2019 | Rupp et al. | |
| 2019/0330898 | A1 | 10/2019 | Rupp et al. | |
| 2020/0018107 | A1 * | 1/2020 | Rupp | E05F 3/14 |
| 2021/0246700 | A1 | 8/2021 | Hoffmann | |
| 2021/0386199 | A1 | 12/2021 | Clarke et al. | |
| 2023/0323719 | A1 | 10/2023 | Duer | |

FOREIGN PATENT DOCUMENTS

| | | |
|---|---|---|
| DE | 20 2020 107 104 | 2/2021 |
| EP | 1 961 332 | 8/2008 |
| EP | 3 922 136 | 12/2021 |
| JP | 2002-121951 | 4/2002 |
| JP | 2008-57258 | 3/2008 |
| JP | 2018-502234 | 1/2018 |
| JP | 2020-513935 | 5/2020 |
| TW | 201829899 | 8/2018 |
| WO | 2018/129568 | 7/2018 |
| WO | 2020/097640 | 5/2020 |
| WO | 2022/126162 | 6/2022 |

* cited by examiner

ASSEMBLY FOR GUIDING AT LEAST ONE MOVABLE FURNITURE PART RELATIVE TO A FURNITURE BODY

The present application is a continuation of International Application PCT/AT2023/060115 filed on Apr. 5, 2023. Thus, all of the subject matter of International Application PCT/AT2023/060115 is incorporated herein by reference.

BACKGROUND OF THE INVENTION

The invention relates to an assembly for guiding at least one movable furniture part, in particular a sliding door or folding sliding door, relative to a furniture body. The assembly comprises at least one guide system which is or can be fastened to the furniture body, at least one support on which the at least one movable furniture part is or can be mounted, in particular pivotally and/or hingedly, and by which the at least one movable furniture part can be moved relative to the at least one guide system between a retracted position and an extended position, at least one drive device, by which the at least one support can be moved relative to the at least one guide system, and which has at least one cable. The at least one cable comprises at least one coupling element, and at least one coupling device for coupling to the at least one coupling element. Furthermore, the invention relates to a piece of furniture with at least one such assembly and to a method for installing and coupling such an assembly.

Such an assembly is already known from document DE 20 2020 107 104 U1, in which a cable of a drive device is arranged via balls on the drive device in the delivery state of the drive device in such a way that a fitter has to manually remove the balls from the drive device in order to then arrange them—also manually—on a support so that the drive device can help the support move out of a receiving shaft.

A disadvantage of the prior art is that the manual connection of the cable of the drive device to the support is cumbersome and requires additional time for installing the assembly. In particular, if the receiving shaft has already been installed, the connection is difficult to obtain due to the drive device being concealed in the receiving shaft and requires the receiving shaft to be uninstalled. If, for example, the cable becomes undesirably detached from the assembly on the support during operation (e.g. due to vibrations and/or inadequate connection), there is no user-friendly way to ensure that the assembly functions properly. In practice, the coupling of the drive device to the support is often forgotten or not corrected properly, which means that an increased force is required to move the movable furniture part and, moreover, it is difficult to determine during operation what the cause of the increased effort Is.

SUMMARY OF THE INVENTION

The object of the present invention is therefore to provide an assembly, a piece of furniture, and a method which are improved compared to the prior art, in which the disadvantages of the prior art are at least partially eliminated, and which are characterized in particular by a particularly convenient, rapid and/or secure coupling of the cable of the drive device to a support or a movable furniture part, wherein the risk of a missing connection between the drive device and the support/movable furniture part is reduced—in a user-friendly and structurally simple manner.

Therefore, according to the invention, the at least one coupling element is arranged, in particular directly, on the at least one guide system, in particular on and/or in a first guide track of the at least one guide system, for automatic coupling with the at least one coupling device.

This makes it possible to ensure a defined position of the at least one coupling element relative to the at least one guide system in order to ensure a secure automatic fastening of the cable in the coupling between the at least one support and the at least one guide system.

A positioning of the at least one cable by a fitter during the coupling of the at least one support to the at least one guide system is therefore no longer necessary, since the coupling can be obtained automatically by the defined orientation of the at least one coupling element. The defined position of the at least one coupling element can be achieved, for example, via an adhesive connection, a stop, a positive connection, etc. Particularly preferably, the defined positioning is achieved via an arrangement within a guide, wherein in particular a static friction in the extended position can be reduced and/or a harmonious insertion and/or extension movement of the movable furniture part can be generated.

In addition, there is the positive feature that it can be ensured that ejection of the at least one support from the retracted position is facilitated by the at least one drive device—without undesirable decoupling between the at least one coupling element and the at least one coupling device. This makes installation easier and reduces maintenance work by specialized personnel.

It is also possible that after the at least one support has been installed on the at least one guide system, no additional manual couplings are required by the fitter, since the connection between the drive unit and the support can be provided by the relative movement itself.

Any release of the coupling after a renewed movement from an extended position (for example active position for subsequent covering of furnishings) towards a retracted position (for example a recessed position in a receiving shaft) of the at least one support or the at least one movable furniture part is effectively prevented, wherein the coupling can always be guaranteed during installation and operation of the assembly.

Accordingly, the fitter only has to arrange the at least one support on the at least one guide system. The at least one coupling device takes the at least one cable with it during a relative movement of the at least one support when the at least one movable furniture part is pushed into a receiving shaft and the at least one drive device absorbs energy by which a movement of the at least one movable furniture part in the direction of the extended position is supported and/or caused.

The first guide track can generally be designed in one piece or in multiple pieces. For example, a first part of the first guide track can be provided for guiding the movement of the at least one support, and a second part of the first guide track can be provided for guiding the movement of the at least one coupling element.

In general, the coupling can be maintained between a time of initial coupling and a dismantling of the assembly—for example by clamping the at least one cable in the at least one coupling device—or can be re-established upon movement of the at least one support from the extended position to the retracted position. Particularly preferably, after installation, contact between the at least one coupling element and the at least one coupling device remains until the assembly is dismantled.

The term cable is to be interpreted so broadly that it also comprises, in an analogous manner, a chain or other flexible components that can withstand tensile stress, such as cords, threads or wires.

As stated at the beginning, protection is also sought for a piece of furniture with at least one such assembly. For example, the piece of furniture can be in the form of a cupboard.

As stated at the outset, protection is also sought for a method for installing and coupling such an assembly, wherein the following method steps are carried out: In a preparatory step, the at least one coupling element is arranged on and/or in the at least one guide system, in a first installation step the at least one support is moved relative to the at least one guide system such that in a further installation step the at least one cable of the at least one drive device is automatically coupled to the at least one coupling device arranged on the movable furniture part and/or the at least one support.

The structural design both speeds up and simplifies the assembly process.

According to an advantageous embodiment of the invention, the at least one coupling element is guided along the at least one guide system, in particular between the extended position of the at least one support and the retracted position of the at least one support, on and/or in the at least one guide system.

By permanently arranging the at least one coupling element on the at least one guide system, a defined positioning of the at least one coupling element can be maintained.

Advantageously, a preload of the at least one drive device can be transmitted to the at least one support in the direction of the extended position by the at least one drive device and via the at least one, preferably plastic-like, coupling element.

This can reduce the amount of force required to move the movable furniture part.

It has proven to be advantageous that the at least one guide system for the preferably form-fitting guidance of the at least one coupling element comprises a coupling element guide, preferably a groove, particularly preferably a T-groove, of the first guide track. Preferably, the coupling element guide has portions with a circular, elliptical, rectangular, or polygonal cross-section.

By means of a coupling element guide, a defined orientation of the at least one coupling element along the at least one guide system can be ensured in a particularly favorable and precise manner. For example, the connection between the at least one coupling element and the at least one guide system can be achieved via a positive connection in one or two—preferably bidirectional—spatial directions.

According to an advantageous embodiment of the invention, the at least one coupling element is arranged continuously, preferably directly, on and/or at least partially in the at least one guide system between the extended position and the retracted position. This can ensure that an improper position of the at least one coupling element relative to the at least one coupling device is inhibited.

It has proven to be advantageous that the at least one coupling device, preferably a driver shoe, can be or is automatically coupled to the at least one cable, preferably the at least one coupling element, of the at least one drive device during a relative movement of the at least one support relative to the at least one guide system. Preferably, the at least one coupling element can be caught by the at least one coupling device and/or pushed along in the direction of the retracted position.

An automatic coupling can be achieved, for example, by accommodating the at least one coupling device and a corresponding geometry of the at least one coupling element for connecting the two component parts.

An advantageous variant of the invention consists in that the at least one coupling device is arranged on the at least one movable furniture part and/or the at least one support. The at least one coupling device is continuously arranged in a movement-coupled manner to the at least one cable and/or the at least one coupling element by a relative movement of the at least one support relative to the at least one guide system, preferably directly and/or at least in regions between the extended position and the retracted position. Preferably, the at least one coupling device is arranged, preferably continuously, in a position of use of the at least one drive device, below the at least one drive device and/or between the at least one drive device and the at least one coupling element.

Particularly preferably, the at least one drive device has at least one outlet opening through which the at least one cable of the at least one drive device, in a state of use of the at least one drive device, protrudes due to gravity essentially vertically downwards and/or transversely to the at least one outlet opening for coupling to the at least one coupling device. Preferably, the at least one cable can be moved along the at least one coupling element and/or essentially parallel to a coupling element guide that may be present.

Due to the at least one cable protruding from the at least one outlet opening due to gravity, no additional guides are required to accommodate the at least one cable in the extended position. The at least one cable can be automatically moved along the at least one guide system by a guide.

In one embodiment of the invention, the at least one coupling element has a longitudinal extension which is preferably larger than a width of the at least one coupling element. The longitudinal extension is guided substantially parallel to the at least one guide system and/or to a coupling element guide which may be present. This makes it possible to reduce a tendency of the at least one coupling element to cant and/or tilt along the at least one guide system and/or to achieve a harmonious movement of the at least one coupling element—for example in addition to favorable sliding friction properties between the at least one coupling element and the at least one guide system.

According to a preferred exemplary embodiment of the invention, the at least one coupling element comprises a guide portion, preferably with a guide indentation, and/or at least one bearing portion, preferably spatially spaced from the guide indentation, and/or a coupling portion, preferably spatially spaced from the guide portion and/or the at least one bearing portion. Preferably, the guide portion, the at least one bearing portion, and/or the coupling portion are arranged in a star shape and/or as at least three essentially orthogonally arranged, particularly preferably as exactly four mirror-symmetrical and/or symmetrically arranged, webs of the at least one coupling element.

The guide portion can, for example, engage in a coupling element guide and provide a linear guide. The at least one bearing portion can prevent undesirable canting or tilting of the at least one coupling element by a support. The coupling portion can be used for connection to the at least one coupling device.

If the webs are designed to be mirror-symmetrical or symmetrical, the at least one coupling element can be used in at least two positions and/or applied to two guide systems arranged on both sides of the furniture body without, for example, having to produce additional injection molding tools, which can save costs in production.

It has proven to be advantageous that the at least one coupling element comprises a contacting portion oriented substantially orthogonally to the guide portion, the at least one bearing portion and/or the coupling portion for coupling to the at least one coupling device. Preferably, the at least one coupling device is designed to correspond to the contacting portion.

The contacting with the at least one coupling device via the contacting portion can be point-like, linear or planar. If the at least one coupling device has, for example, a tapered receiving area, the contacting portion and/or the coupling portion can be clamped within the at least one coupling device for connection. In general, application on a side surface is also conceivable.

Furthermore, preferably the at least one coupling device comprises a base, preferably with at least one opening for fastening means, for connection to the at least one movable furniture part and/or the at least one support and a receptacle, preferably protruding transversely from the base, preferably with three substantially orthogonal side surfaces. Preferably, the receptacle comprises a tapered receptacle region, particularly preferably for coupling to a possibly present contacting portion of the at least one coupling element.

In a further embodiment, the at least one coupling element, preferably via a possibly present web, partially engages in the at least one guide system and partially protrudes from the at least one guide system, preferably substantially in an orthogonal direction from the at least one guide system, and/or can be received by the at least one coupling device substantially in an orthogonal direction to the at least one guide system for moving the at least one support along a longitudinal direction of the at least one guide system.

This particularly facilitates a safe and/or simple coupling of the components involved.

According to an advantageous embodiment of the invention, the at least one guide system comprises at least one second guide track for guiding the at least one movable furniture part, wherein the at least one second guide track runs transversely relative to a longitudinal direction of the first guide track in a state of use of the assembly.

The second guide track can be used to conceal furnishings, for example in conjunction with a carriage. A carriage can generally also be used within a receiving slot of a piece of furniture.

Particularly preferably, during a first relative movement of the at least one support relative to the at least one guide system, the at least one coupling device can be automatically coupled to the at least one coupling element and/or the at least one cable is connected to the at least one coupling device in the extended position, in the retracted position, and/or between the extended position and the retracted position. This can prevent the at least one cable from detaching from the at least one coupling device and subsequently remaining in an uncoupled state.

According to an advantageous embodiment of the invention, the at least one drive device comprises a cable drum for winding and unwinding the at least one cable and at least one force storage device for pretensioning the at least one cable drum. The at least one cable drum and/or the at least one force storage device is arranged, particularly preferably completely, within a housing of the at least one drive device.

In general, the at least one cable is wound on the at least one cable drum in the extended position for compact storage, with a free end protruding from the at least one drive device. If the at least one cable is pulled out of the at least one drive device by a relative movement of the at least one support in the direction of the retracted position, the at least one energy storage device is pretensioned. The stored energy is released to the at least one movable furniture part when the at least one movable furniture part moves in the direction of the extended position.

Advantageously, the at least one force storage device can be tensioned during a movement of the at least one support in the direction of the retracted position and/or is pretensioned or not tensioned in the extended position and/or wherein an ejection process of the at least one support, preferably together with the sliding door or a folding sliding door, can be supported and/or carried out by a movement coupling between the at least one coupling element and the at least one coupling device and/or via the at least one force storage device and/or at least one ejection device, preferably from a receiving shaft.

It has proven to be advantageous that the at least one support can be moved from the retracted position into an extended position, preferably automatically, via the at least one drive device.

According to an advantageous embodiment of the invention, at least one ejection device is provided, with which the at least one support can be ejected from the retracted position by the at least one ejection device at least in portions in the direction of the extended position. Preferably, the at least one support can be moved in the retracted position by exerting pressure on the at least one support into an overpressed position located behind the retracted position, whereby the ejection device can be triggered and/or can be locked in the retracted position by the at least one ejection device.

The at least one ejection device can initiate the movement of the at least one movable furniture part along the at least one guide system—for example in the sense of a touch-latch device—wherein a transition from a parking position to a relative movement in the direction of the extended position can be brought about automatically.

Particularly preferably, the assembly comprises at least one receiving shaft in which the at least one movable furniture part can be arranged in the retracted position, preferably completely. Preferably, the at least one movable piece of furniture in the extended position can be moved transversely to a longitudinal extension of the at least one receiving shaft for concealing a furnishing, particularly preferably via at least one optionally present second guide track.

The at least one receiving shaft results in an aesthetically pleasing piece of furniture, and the assembly can be hidden within the at least one receiving shaft. If necessary, the at least one movable furniture part can be pulled out to conceal furnishings and moved in the direction transverse to the longitudinal extension.

Preferably, the piece of furniture has a furniture body and at least two furniture parts that are mounted so as to be movable relative to the furniture body. The furniture parts are hinged to one another via a vertically extending axis in a use state of the assembly, and the at least two furniture parts are movable by the assembly between the extended position in which the furniture parts are aligned substantially parallel to one another, and a second position in which the furniture parts are aligned substantially coplanar to one another. Preferably, the furniture body has at least one receiving shaft for receiving the furniture parts in the retracted position, and/or the furniture parts are movable from the retracted position towards the extended position via the at least one drive device.

Preferably, at least one force storage device of the at least one drive device is tensioned during a movement of the support from the extended position towards the retracted position, and/or a movement of the support from the retracted position towards the extended position is supported, preferably with the aid of at least one ejection device, and/or the at least one coupling element remains continuously motion-coupled with the at least one coupling device between the retracted position and the extended position.

BRIEF DESCRIPTION OF THE DRAWINGS

Further details and advantages of the present invention are explained in more detail below with reference to the drawings, in which.

DETAILED DESCRIPTION OF THE INVENTION

Figure 1A:
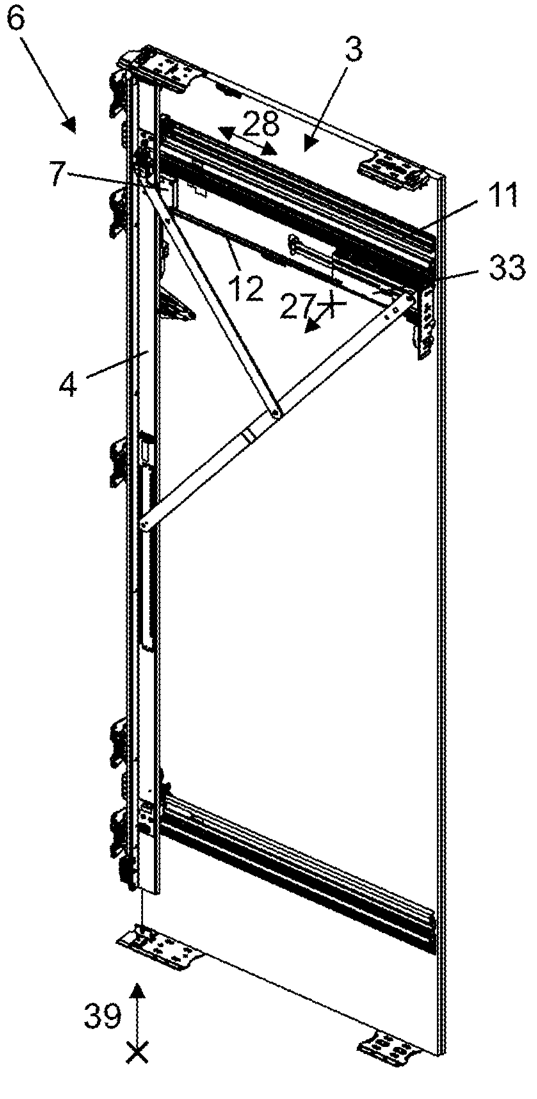
FIGS. 1*a*, 1*b* show a guide system with a drive device for moving furniture parts according to a preferred embodiment in two perspective views.

FIG. 1*a* shows an assembly for guiding a movable furniture part 1 such as a sliding door, a folding sliding door or the like relative to a furniture body 2 (see FIG. 7), comprising a guide system 3 fastened to the furniture body 2, a support 4 on which the movable furniture part 1 can be pivotally or hingedly mounted and via which the movable furniture part 1 can be moved relative to the guide system 3 between a retracted position 5 and an extended position 6 (see FIG. 7), and a drive device 7 with which the support 4 can be moved relative to the guide system 3.

Figure 1B:
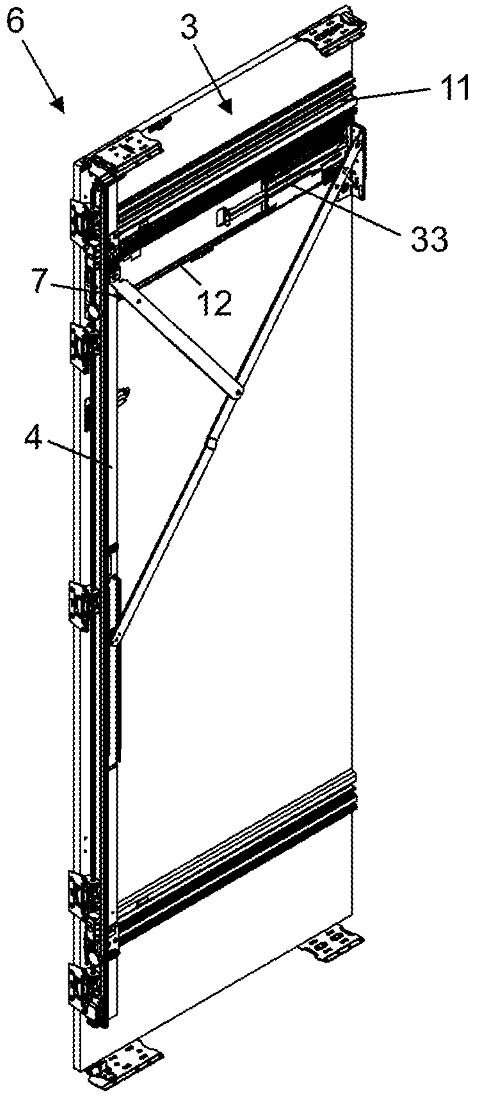

FIG. 1*b* differs from FIG. 1*a* only in that the assembly is shown in a different viewing direction. In the assembly, an ejection device 33 is provided, with which the support 4 can be ejected in portions from the retracted position 5 through the ejection device 33 in the direction of the extended position 6. The support 4 can be moved in the retracted position 5 by exerting pressure on the support 4 into an overpressed position located behind the retracted position 5, whereby the ejection device 33 can be activated. The support 4 can be locked in the retracted position 5 by the ejection device 33 in order to prevent an undesired movement of the support 4 out of a fully retracted position.

The support 4 can be moved automatically from the retracted position 5 into the extended position 6 via the drive device 7 if there is sufficient preload. However, it is preferred to merely support manual operation of the support, which is additionally facilitated by the ejection device 33.

Figure 2A:
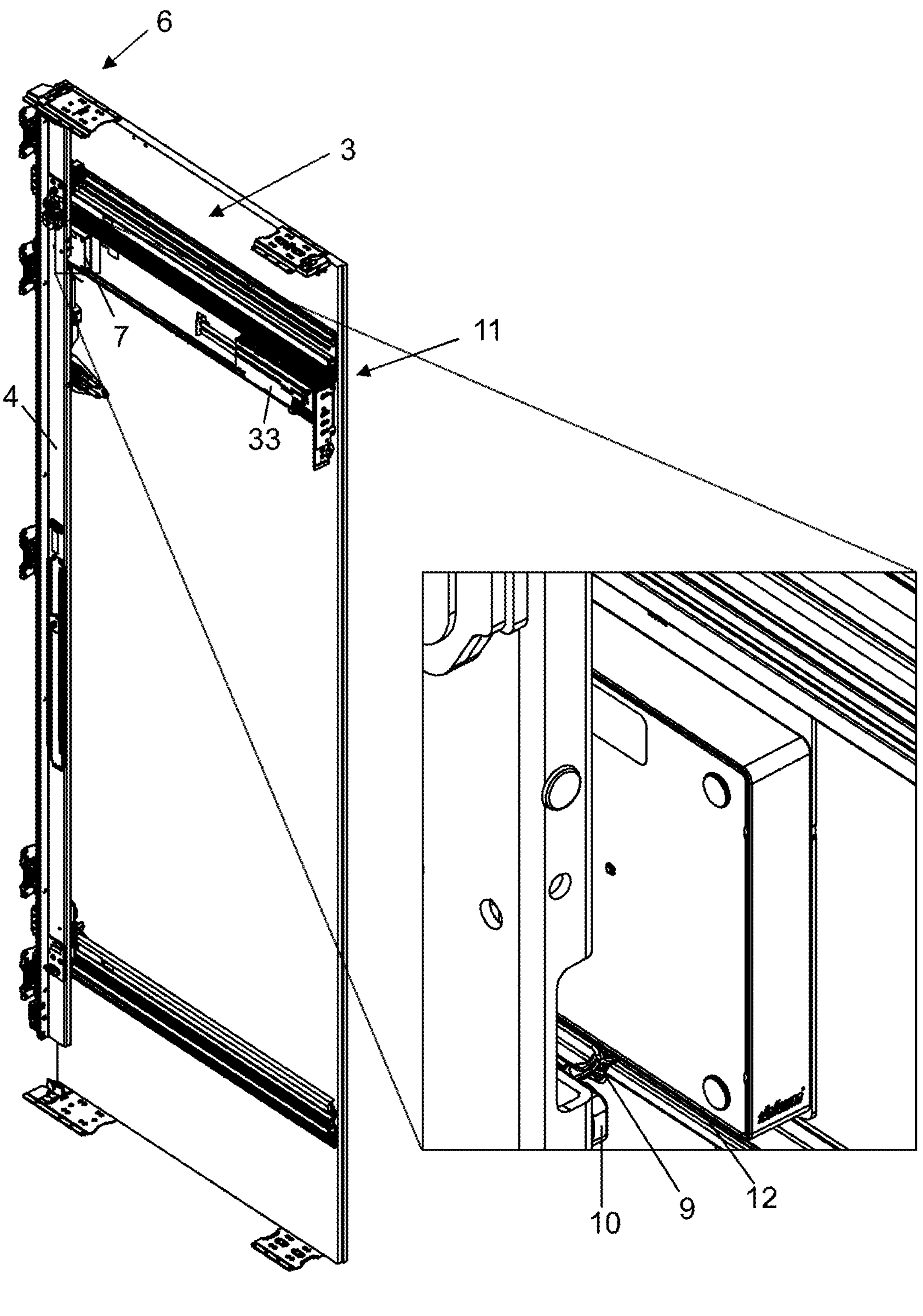
FIGS. 2*a*, 2*b* show the guide system according to the embodiment of FIG. 1*a* with hidden stabilizing struts with an enlarged detail in the region of the drive device in two perspective views from different angles.

In FIG. 2*a* it can be seen that the support 4, on which the movable furniture part 1 is to be installed, is located in the extended position 6. In the enlarged detail it can be seen that the drive device 7 comprises a coupling element 9 which—concealed by the support 4—is arranged on a cable 8 of the drive device 7.

Figure 2B:
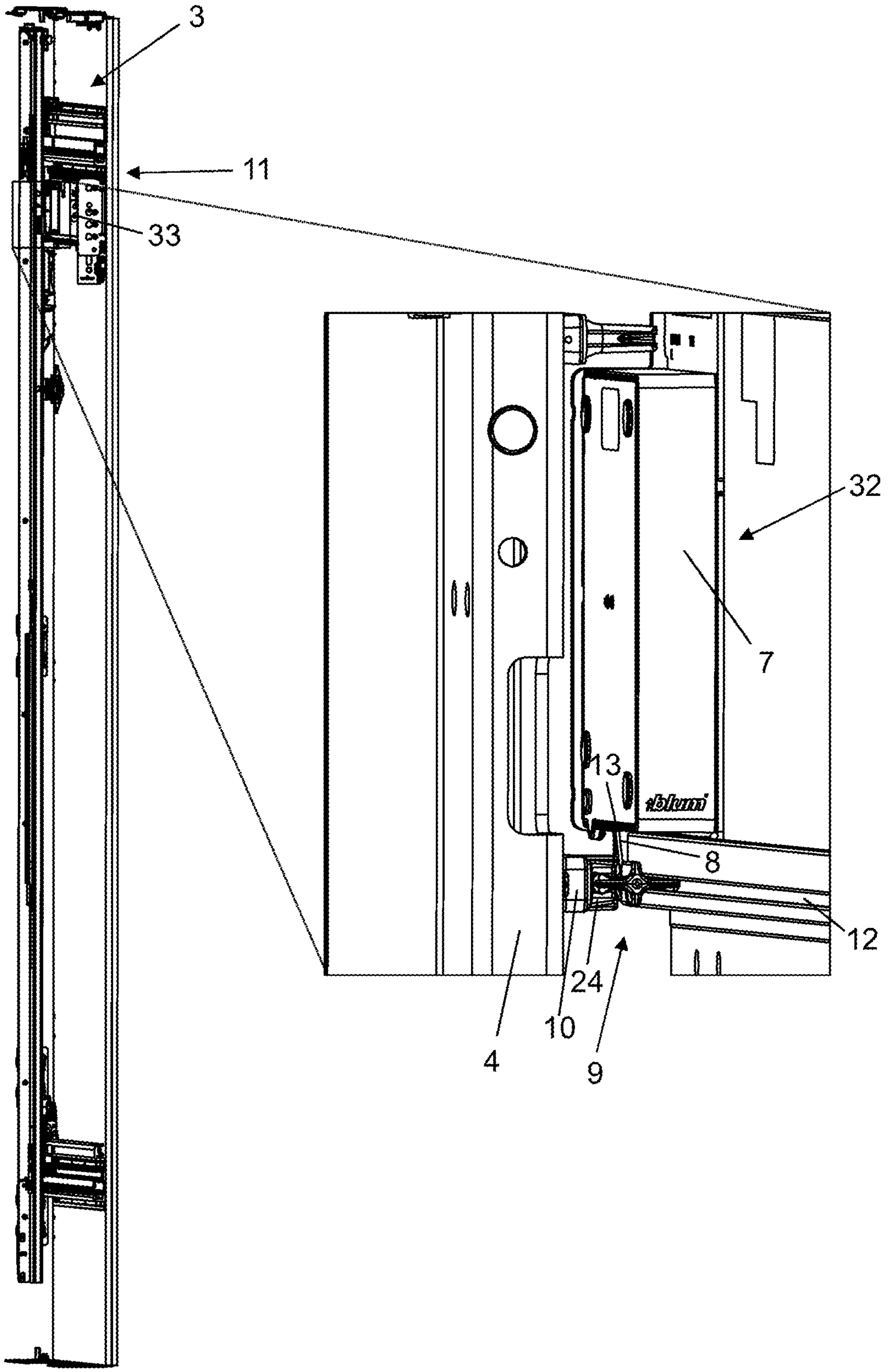

FIG. 2*b* shows the assembly according to FIG. 2*a* at an acute angle to the guide system 3. In this view, it can be seen that the at least one guide system 3 for the positive guidance of the coupling element 9 comprises a coupling element guide 12 in the form of a T-slot of a first guide track 11.

Before the support 4 is mounted on the guide system 3, the coupling element 9 is arranged directly on the guide system 3 in portions in the first guide track 11 for automatic coupling with a coupling device 10. In general, it is also conceivable that the coupling element is fixed on the outside of the guide system 3 in a defined position. The coupling device 10 is provided for coupling the movable furniture part 1 with the coupling element 9 of the drive device 7, which is mounted on the support 4. In general, the coupling device 10 can also be fastened to the movable furniture part 1.

Figure 3A:
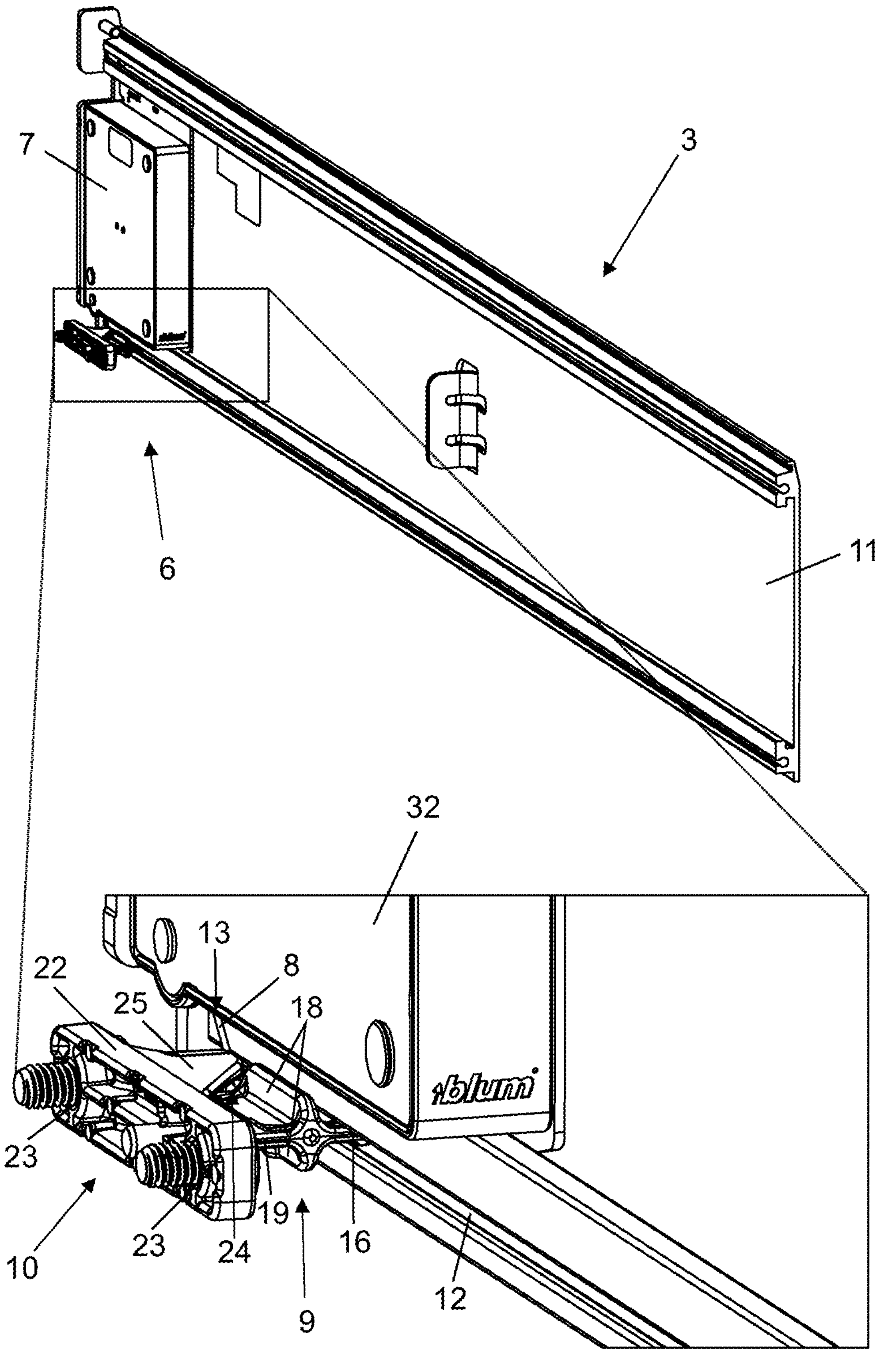
FIGS. 3*a*-3*c* show a coupling element of the drive device and a coupling device for coupling the furniture parts with the guide system in a perspective view as well as in a perspective view and a view from the side with the coupling device hidden, each with an enlarged detail of the coupling element.

FIG. 3*a* shows the coupling between the coupling device 10 and the coupling element 9 on the guide system 3. In this exemplary embodiment, the coupling element guide 12 has portions of with a circular cross-section, although, for example, elliptical or polygonal cross-sections are also possible for a form-fitting connection between coupling element 9 and first guide track 11 in the orthogonal direction 27.

When installing the support 4, the coupling device 10 is brought into contact with the coupling element 9 for the first time. Thus, an improper connection between the coupling element 9 and the coupling device 10 is prevented. The coupling element 9 remains constantly arranged directly on and in portions in the guide system 3 between the extended position 6 and the retracted position 5.

During a first relative movement of the support 4 relative to the guide system 3 (when the support 4 has been installed on the guide system 3), the coupling device 10 can be automatically coupled to the coupling element 9 and the cable 8 is connected or motion-coupled to the coupling device 10 via the coupling element 9 in the extended position 6, the retracted position 5 and between the extended position 6 and the retracted position 5.

A method for installing and coupling the assembly can be carried out as follows. In a preparatory step, the coupling element 9 is arranged on or in the guide system 3. In a subsequent first installation step, the support 4 is moved relative to the guide system 3, and in a subsequent and automatic installation step, the cable 8 of the drive device 7 is automatically coupled to the coupling device 10 arranged on the movable furniture part 1 or the support 4.

The coupling device 10 is arranged on the support 4, and the coupling device 10 is arranged in a motion-coupled manner on the coupling element 9 by a relative movement of the support 4 relative to the guide system 3, continuously and directly between the extended position 6 and the retracted position 5.

In the position of use of the drive device 7, the coupling device 10 is arranged continuously below the drive device 7 and in some regions between the drive device 7 and the coupling element 9.

The coupling element 9 remains continuously coupled to the coupling device 10 between the retracted position 5 and the extended position 6.

The coupling device 10 in the form of a driver shoe can be automatically coupled to the cable 8 and the coupling element 9 of the drive device 7 when the support 4 moves relative to the guide system 3. The coupling element 9 is captured by the coupling device 10 and pushed in the direction of the retracted position 5.

Figure 3B:
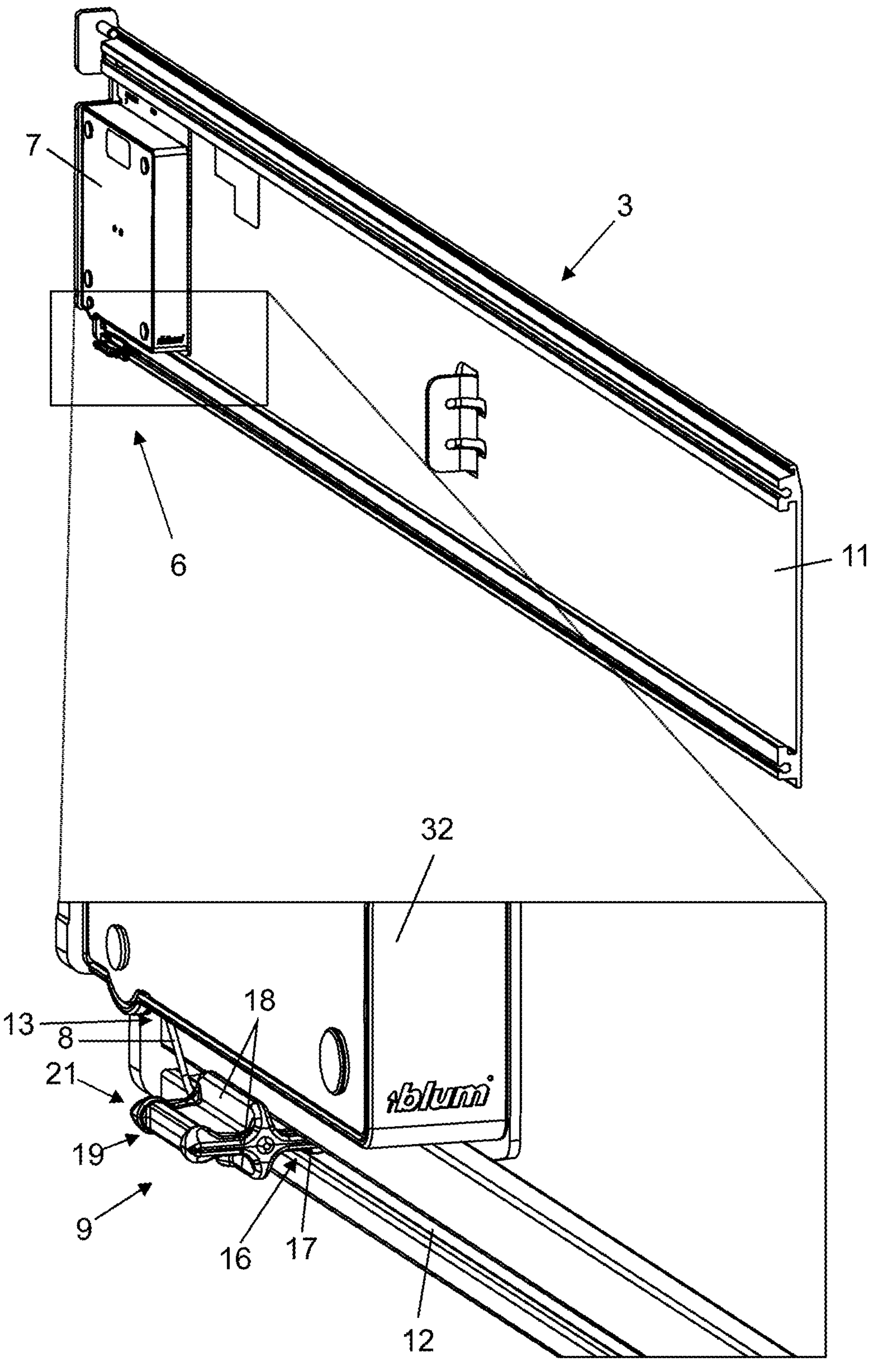
Figure 3C:
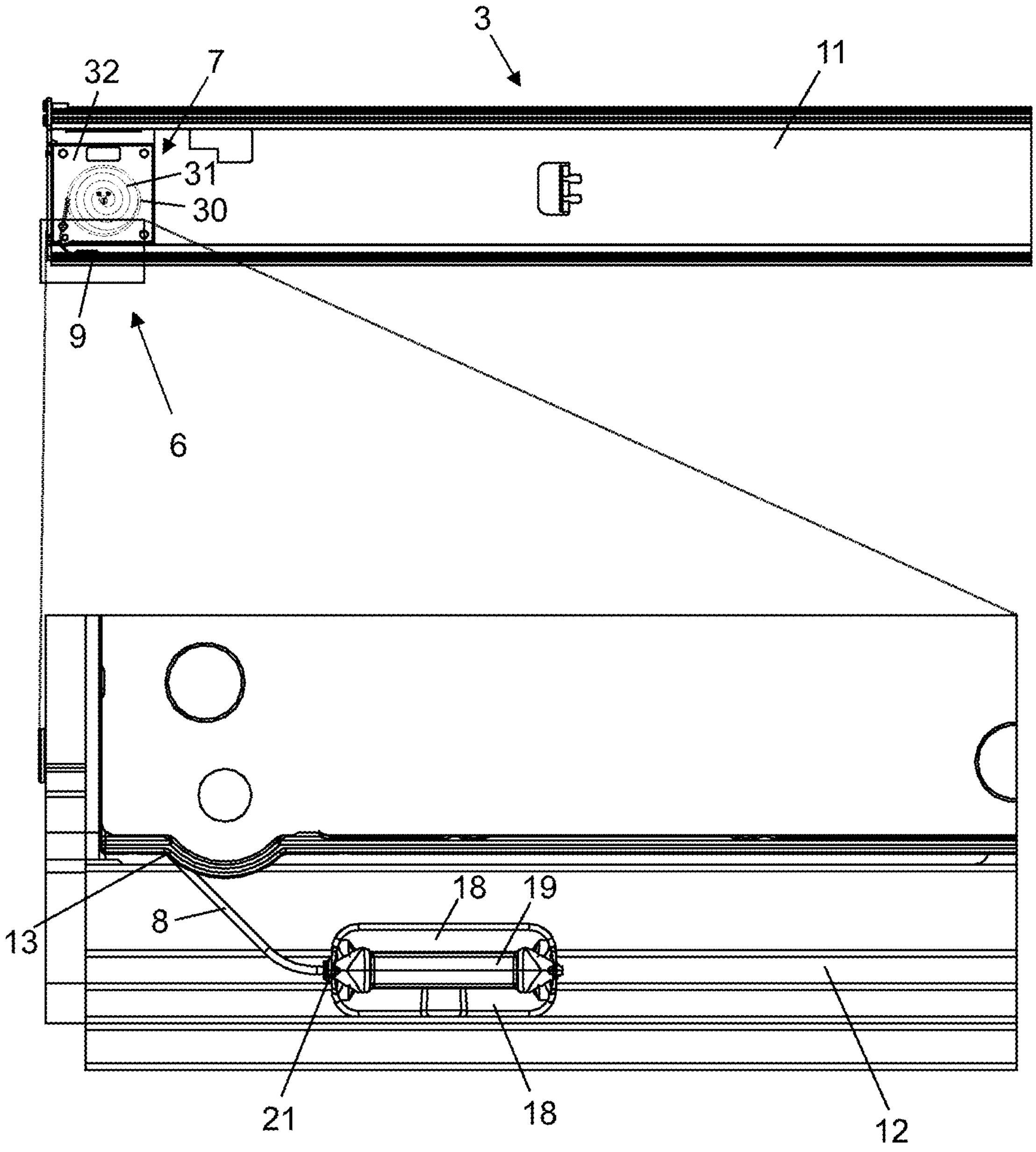

As can be seen in the views according to FIGS. 3*b* and 3*c*, the coupling element 9 is guided in the guide system 3 along the guide system 3 between the extended position 6 of the support 4 and the retracted position 5 of the support 4.

In FIG. 3*c*, it is schematically shown in dotted lines that the drive device 7 comprises a force storage device 31, which is tensioned during a movement of the support 4 from the extended position 6 in the direction of the retracted position 5, and at least supports a movement of the support 4 from the retracted position 5 in the direction of the extended position 6. An ejection device 33 can also be additionally used to assist in an ejection process of the support 4 from the retracted position 5; however, this is generally not necessary.

The drive device 7 comprises a cable drum 30 (shown in dotted lines) for winding and unwinding the cable 8 and the energy storage device 31 for pretensioning the cable drum 30. The cable drum 30 and the energy storage device 31 are arranged completely within a housing 32 of the drive device 7.

The force storage device 31 can be tensioned when the support 4 moves in the direction of the retracted position 5, and is pretensioned or not tensioned in an extended position 6. An ejection process of the support 4 is supported together with the sliding door or the folding sliding door by a movement coupling between the coupling element 9 and the coupling device 10 as well as via the force storage device 31 and optionally in some regions via the ejection device 33 from a receiving shaft 34 (see FIG. 7). Thus, a required manual force on the support 4 is reduced or optionally no longer required.

By means of the drive device 7 and via the plastic-like coupling element 9, a preload of the drive device 7 can be transmitted to the support 4 via the coupling device 10 in the direction of (i.e., toward) the extended position 6 so as to thereby cause or assist movement of the support 4 toward the extended position 6.

Figure 4:
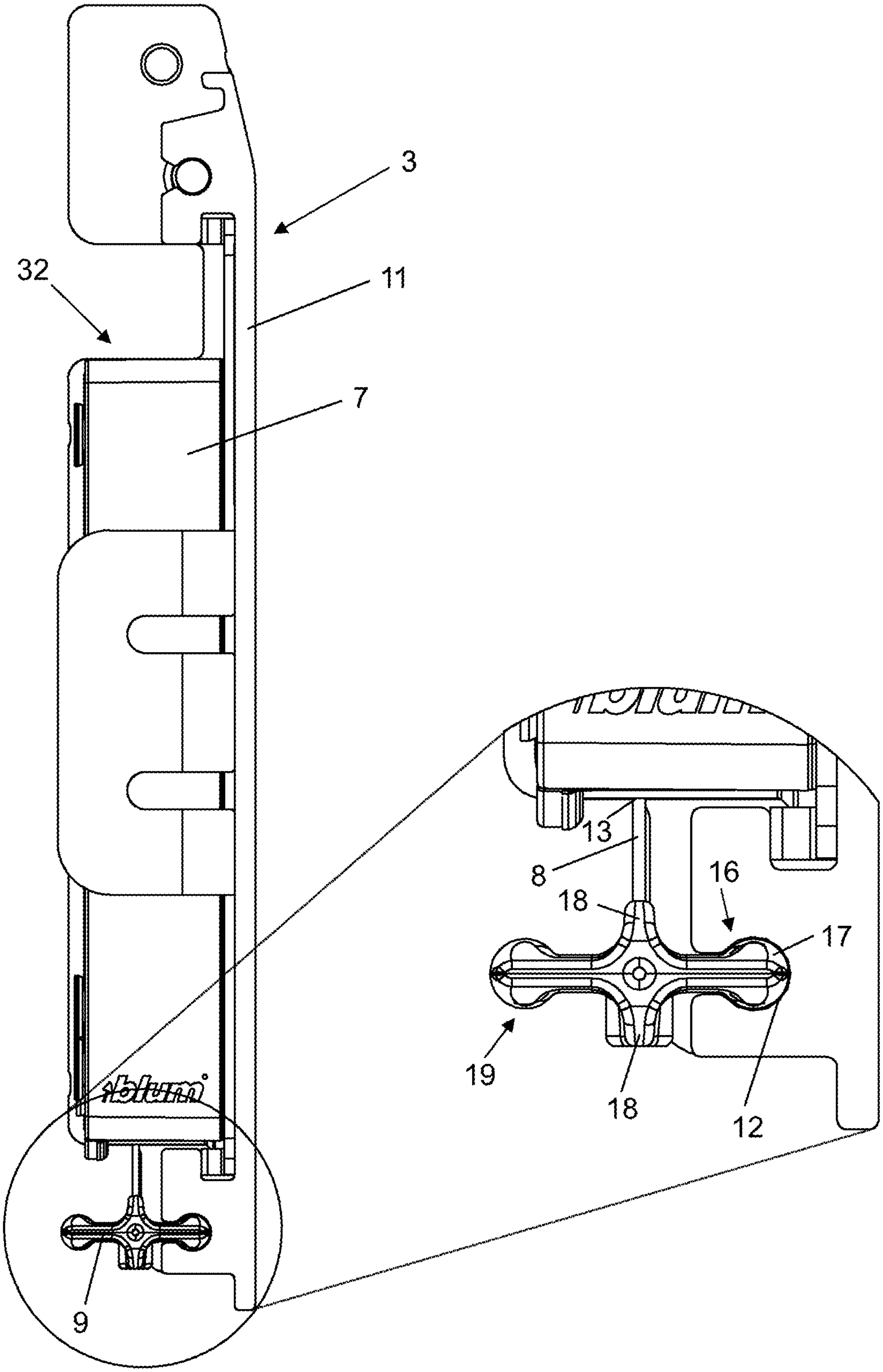
FIG. 4 shows the drive device with the coupling element arranged on the guide system in a view from the front with an enlarged detail.

FIG. 4 shows that the drive device 7 has an outlet opening 13 through which the cable 8 of the drive device 7 protrudes, in a state of use of the drive device 7 in the extended position 6, due to gravity essentially vertically downwards for coupling with the coupling device 10. After displacement of the coupling element 9, the cable 8 protrudes transversely from the outlet opening 13, since the cable 8 is moved along the coupling element 9 and parallel to the coupling element guide 12.

Figure 5A:
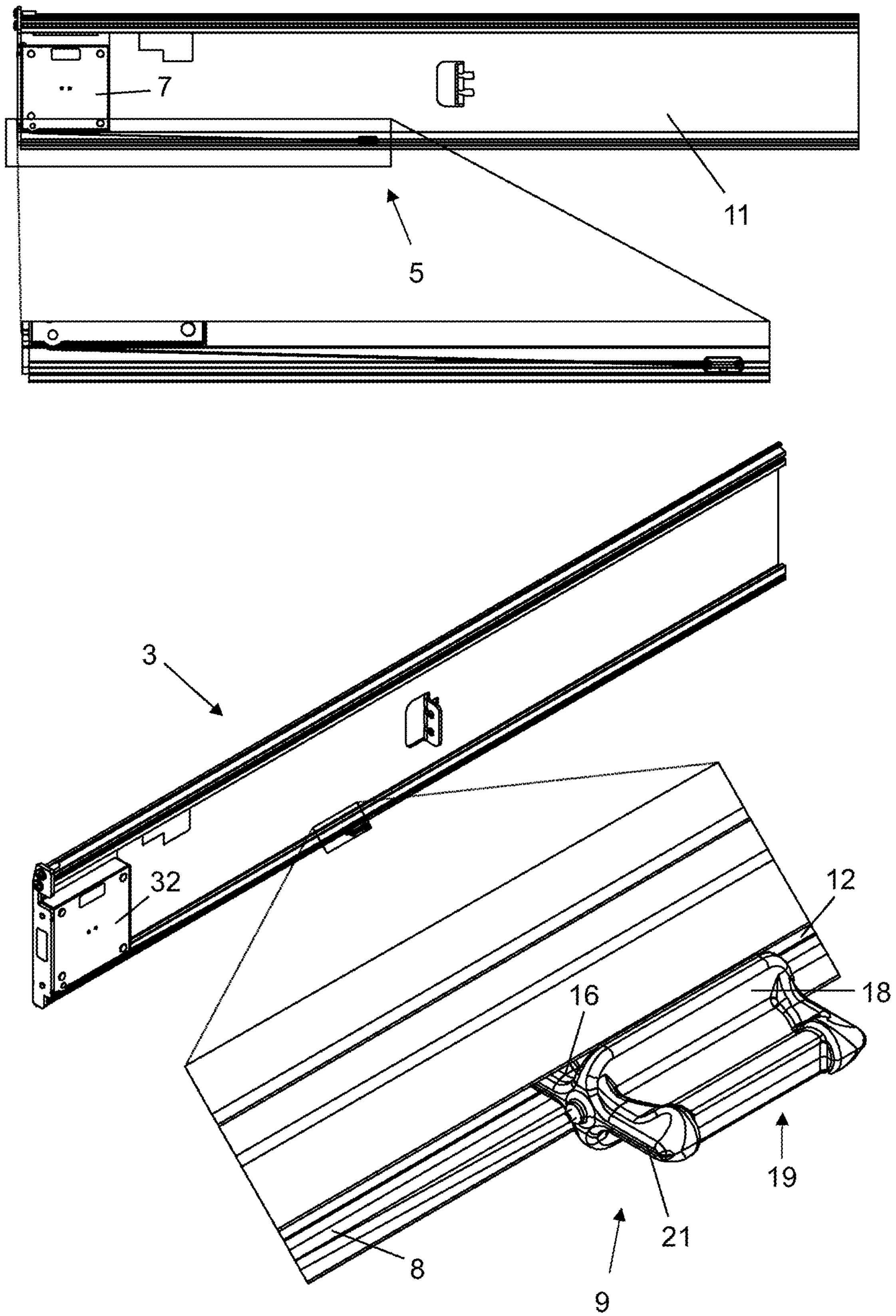
FIGS. 5*a*, 5*b* show a movement of the coupling element along the guide system between an extended position and a retracted position in a side view and a perspective view, each with an enlarged detail of the coupling element.

FIG. 5*a* shows a partially retracted position 5, wherein the coupling element 9 has been moved along the guide system 3 by the coupling device 10. The drive device 7 is partially tensioned.

Figure 5B:
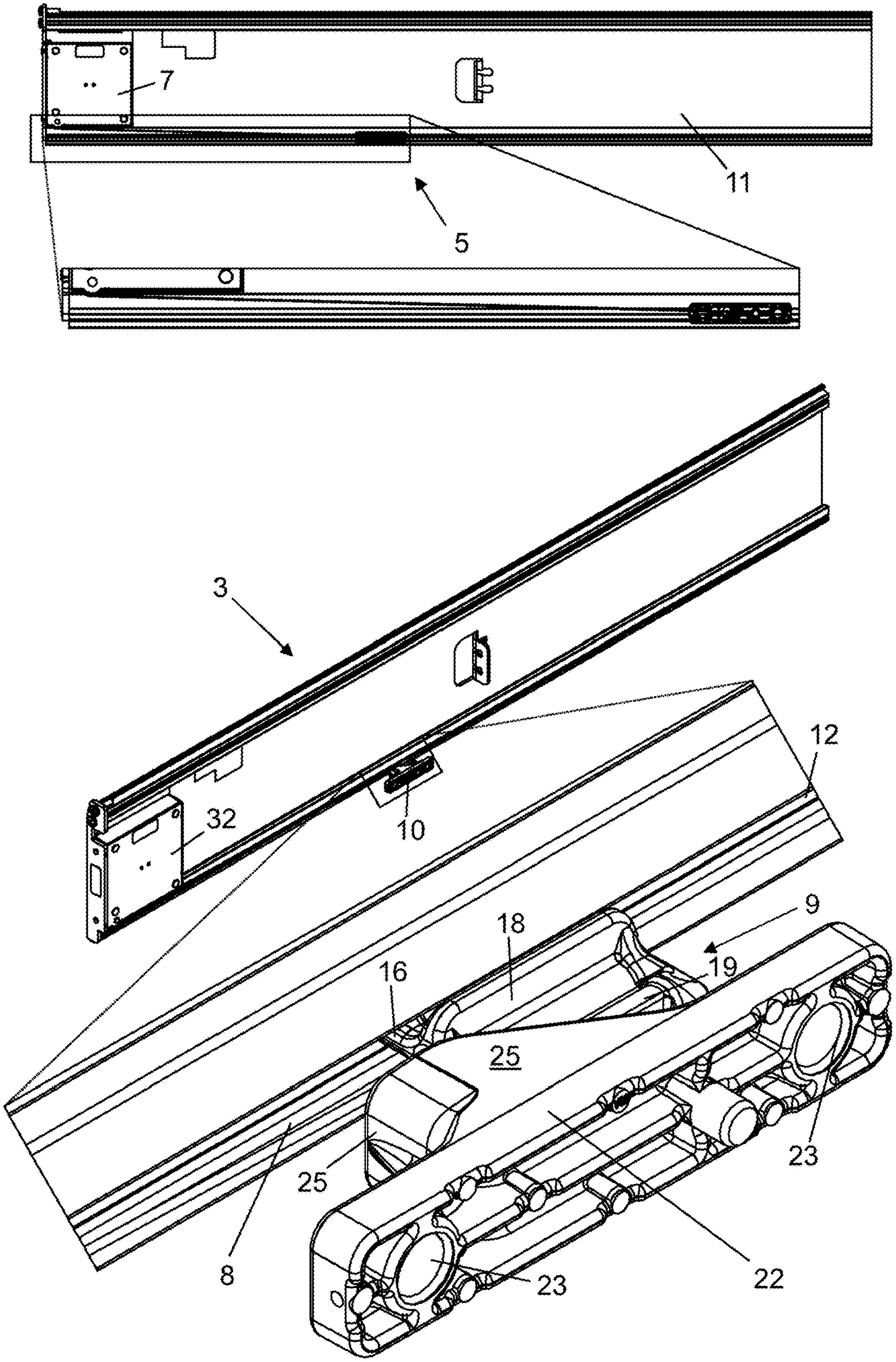

FIG. 5*b* differs from FIG. 5*a* only in that the positioning of the coupling device 10 on the coupling element 9 is shown. In the direction of the retracted position 5, the coupling device 10 moves the entrained coupling element 9, while in the direction of the extended position the coupling element 9 moves the entrained coupling device 10.

In the exploded view 6*a* of the component parts for the coupling between the support 4 and the guide system 3, it can be seen that the coupling element 9 has a longitudinal extension 14 which is larger than one (both) width(s) 15 of the coupling element 9 and wherein the longitudinal extension 14 is guided parallel to the guide system 3 and the coupling element guide 12.

The coupling element 9 comprises a guide portion 16 with two guide indentations 17, two bearing portions 18 spatially spaced from the guide indentation 17 and a coupling portion 19 spatially spaced from the guide portion 16 and the bearing portions 18.

The guide portion 16, the bearing portions 18 and the coupling portion 19 are star-shaped and arranged as four orthogonally arranged—mirror-symmetrical and symmetrically oriented—webs of the coupling element 9.

The coupling element 9 comprises a contacting portion 21 oriented orthogonally to the guide portion 16, the bearing portions 18 and the coupling portion 19 for coupling to the coupling device 10.

The coupling element 9 engages in portions in the guide system 3 via the guide portion 16 designed as a web and partially protrudes from the guide system 3 in the orthogonal direction 27. The coupling element 9 can be received by the coupling device in an orthogonal direction 27 to the guide system 3 for moving the support 4 along a longitudinal direction 28 of the guide system 3.

Figure 6A:
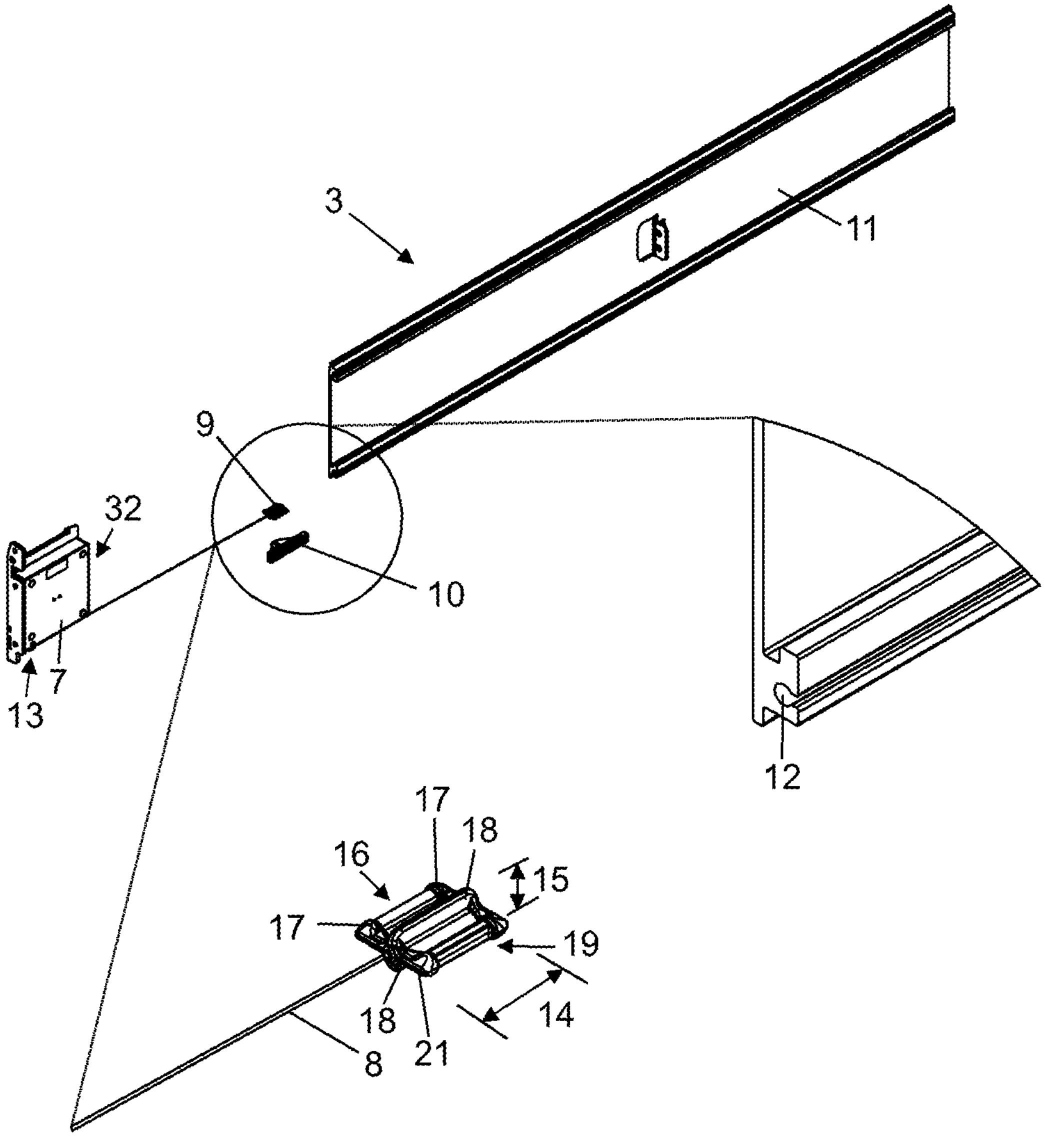
FIGS. 6*a*, 6*b* show an exploded view of the components involved in the coupling in perspective view as well as of the coupling device in two perspective views and a top view.
Figure 6B:
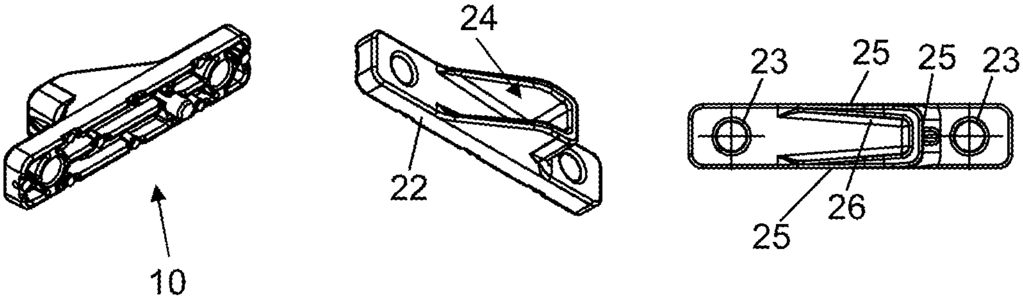

FIG. 6*b* shows that the coupling device 10 is designed to correspond to the contacting portion 21 of the coupling element 9.

The coupling device 10 comprises a base 22 with two openings 23 for fastening means (see FIG. 3*a*) for connection to the movable furniture part 1 or the support 4 and a receptacle 24 protruding transversely from the base 22.

The receptacle 24 comprises three orthogonal side surfaces 25, wherein the receptacle 24 has a tapered receiving region 26 for coupling with the contacting portion 21 of the coupling element 9.

Figure 7:
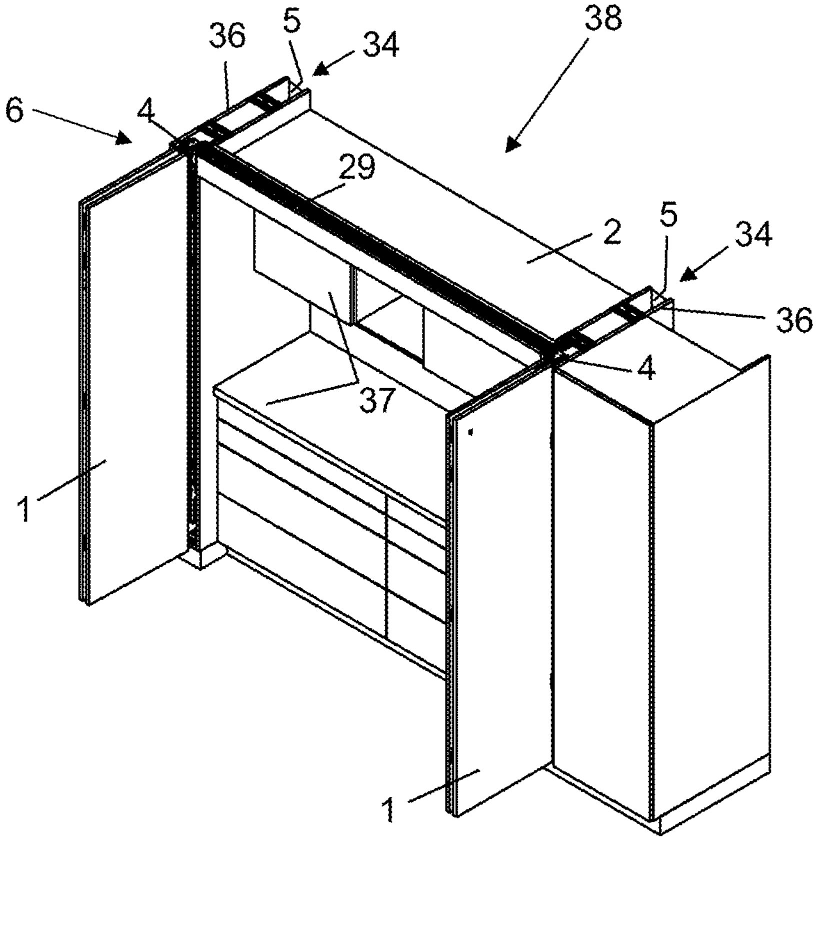
FIG. 7 shows a piece of furniture according to a preferred embodiment in a perspective view.

FIG. 7 shows a piece of furniture 38 with an assembly, wherein the piece of furniture 38 has a furniture body 2 and on both sides two furniture parts 1 in the form of a folding sliding door which are mounted so as to be movable relative to the furniture body 2. A revolving door or sliding door can also be used on the piece of furniture 38. In a state of use of the assembly, the furniture parts 1 are hingedly connected to one another via a vertically extending axis 39 (cf. FIG. 1*a*), wherein the two furniture parts 1 are movable by the assembly between the extended position 6, in which the furniture parts 1 are aligned parallel to one another, and a second position, in which the furniture parts 1 are aligned coplanar to one another.

The furniture body 2 comprises two receiving shafts 34 for receiving the furniture parts 1 in the retracted position 5 (indicated by an "x"), wherein the furniture parts 1 can be moved from the retracted position 5 towards the extended position 6 via the drive device 7 concealed by the receiving shaft 34.

The assembly according to this embodiment comprises the receiving shaft 34, in which the movable furniture part 1 can be completely arranged in the retracted position 5, wherein movable furniture 1 in the extended position 5 can be moved transversely to a longitudinal extension 36 [of the receiving shaft 34 for concealing furnishings 37 via a second guide track 29.

The second guide track 29 runs in the use state of the assembly relative to the longitudinal direction 28 of the first guide track 11 and for guiding the movable furniture part 1 in a further movement portion transversely to the first guide track 11.

The invention claimed is:

1. An assembly for guiding a movable furniture part relative to a furniture body, the assembly comprising:

a guide system to be fastened to the furniture body, a support on which the movable furniture part is to be mounted, and by which the movable furniture part is movable relative to the guide system between a retracted position and an extended position, a drive device configured to move the support relative to the guide system, the drive device including a cable comprising a coupling element, a coupling device configured to be coupled to the coupling element, and a receiving shaft to receive the movable furniture part in the retracted position, wherein the coupling element is arranged directly on and/or in a guide track of the guide system to enable automatic coupling of the coupling element with the coupling device, wherein the drive device is configured to transmit a preload to the support in a direction toward the extended position via the coupling element.

2. The assembly according to claim 1, wherein the coupling element is configured to be guided along the guide system between the extended position of the support and the retracted position of the support.

3. The assembly according to claim 1, wherein the coupling element is plastic.

4. The assembly according to claim 1, wherein the guide system is configured to provide form-fitting guidance of the coupling element, and the guide system includes a coupling element guide.

5. The assembly according to claim 4, wherein the coupling element guide is a T-groove of the guide track, and the coupling element guide has portions with a circular, elliptical, rectangular, or polygonal cross-section.

6. The assembly according to claim 1, wherein the coupling element is continuously arranged between the extended position and the retracted position.

7. The assembly according to claim 1, wherein the coupling device is configured to be coupled automatically to the cable of the drive device during a movement of the support relative to the guide system.

8. The assembly according to claim 7, wherein the coupling device is a driver shoe configured to be coupled automatically to the coupling element of the cable during the movement of the support relative to the guide system, the coupling element being configured to be caught by the coupling device and/or pushed along toward the retracted position.

9. The assembly according to claim 1, wherein the coupling device is arranged on at least one of the movable furniture part and the support, the coupling device being continuously arranged in a motion-coupled manner to at least one of the cable and the coupling element by a movement of the support relative to the guide system.

10. The assembly according to claim 9, wherein the support is configured to move relative to the guide system directly and/or at least partially between the extended position and the retracted position, the coupling device being arranged continuously during use of the drive device below the drive device and/or between the drive device and the coupling element.

11. The assembly according to claim 1, wherein the drive device has an outlet opening through which the cable of the drive device protrudes during use of the drive device.

12. The assembly according to claim 11, wherein the cable is movable via the coupling element along a coupling element guide of the guide system.

13. The assembly according to claim 1, wherein a length of the coupling element is larger than a width of the coupling element, and the coupling element is guided such that a longitudinal axis of the coupling element is substantially parallel to the guide system and/or to a coupling element guide of the guide system.

14. The assembly according to claim 1, wherein the coupling element comprises:

a guide portion, a bearing portion, and/or a coupling portion, and/or the bearing portion.

15. The assembly according to claim 14, wherein the coupling element comprises a contacting portion oriented substantially at a right angle to the guide portion, the bearing portion, and/or the coupling portion for coupling to the coupling device.

16. The assembly according to claim 15, wherein the coupling device is configured to correspond to the contacting portion.

17. The assembly according to claim 14, wherein the guide portion has a guide indentation, and the bearing portion is spaced apart from at least one of the guide indentation and the bearing portion, and the coupling portion is spaced apart from at least one of the guide portion and the bearing portion, wherein the guide portion, the bearing portion, and/or the coupling portion are arranged in a star shape having at least three webs.

18. The assembly according to claim 17, wherein the at least three webs is exactly four symmetrically arranged webs.

19. The assembly according to claim 1, wherein the coupling device comprises:

a base configured connect the coupling device to the movable furniture part and/or the support, and a receptacle.

20. The assembly according to claim 19, wherein the base has an opening to receive a fastener, and the receptacle protrudes transversely from the base, and wherein the receptacle has three orthogonal side surfaces, the receptacle comprising a tapered receptacle region for coupling the coupling device to a contacting portion of the coupling element.

21. The assembly according to claim 1, wherein the coupling element:

(i) is configured to partially engage in the guide system, and partially protrude from the guide system, and/or (ii) is configured to be received by the coupling device in substantially an orthogonal direction to the guide system, to move the support along a longitudinal direction of the guide system.

22. The assembly according to claim 21, wherein the coupling element partially engages in the guide system via an optional web, and partially protrudes from the guide system in an orthogonal direction relative to the guide system.

23. The assembly according to claim 1, wherein the guide track is a first guide track, the guide system comprising a second guide track for guiding the movable furniture part, wherein the second guide track extends transversely relative to a longitudinal direction of the first guide track in use.

24. The assembly according to claim 1, wherein, during the movement of the support relative to the guide system, the coupling device is automatically coupled to the coupling element, and/or the cable is connected to the coupling device in at least one of the extended position, the retracted position, and between the extended position and the retracted position.

25. The assembly according to claim 1, wherein the drive device comprises:

a cable drum for winding and unwinding the cable, and a force storage device for pretensioning the cable drum.

26. The assembly according to claim 25, wherein:

(i) the force storage device is configured:

(a) to be tensioned during a movement of the support in the direction of the retracted position and/or (b) to be pretensioned in the extended position, and/or (ii) the coupling element and the coupling device are configured to perform an ejection process of the support by at least one of:

(a) a movement coupling between the coupling element and the coupling device, (b) the force storage device, and (c) an ejection device.

27. The assembly according to claim 25, wherein at least one of the cable drum and the force storage device is arranged completely within a housing of the drive device.

28. The assembly according to claim 1, wherein the support is movable from the retracted position into the extended position by the drive device.

29. The assembly according to claim 28, wherein the support is automatically movable from the retracted position into the extended position by the drive device.

30. The assembly according to claim 1, further comprising an ejection device configured to at least partially eject the support from the retracted position in the direction of the extended position.

31. The assembly according to claim 30, wherein the support is movable in the retracted position by exerting pressure on the support into an overpressed position located behind the retracted position, whereby the ejection device is activated and/or locked in the retracted position by the ejection device.

32. The assembly according to claim 1, wherein the receiving shaft is configured to completely receive the movable furniture part therein in the retracted position, and the assembly is configured to allow the movable furniture part to be moved transversely to a longitudinal extension of the receiving shaft in the extended position to conceal a furnishing.

33. The assembly according to claim 32, wherein the guide track is a first guide track, and the assembly is configured to allow the movable furniture part to be moved transversely to the longitudinal extension of the receiving shaft via a second guide track.

34. The assembly according to claim 1, wherein the coupling device is formed integrally with at least one of the movable furniture part and the support.

35. A piece of furniture comprising the assembly according to claim 1.

36. The piece of furniture according to claim 35, further comprising:

a furniture body, and a furniture part mounted to be movable relative to the furniture body, wherein:

(i) the furniture body has the receiving shaft configured to receive the furniture part in the retracted position, and/or (ii) the furniture part is movable from the retracted position toward the extended position via the drive device.

37. The piece of furniture according to claim 35, further comprising:

a furniture body, and at least two furniture parts mounted to be movable relative to the furniture body, wherein the furniture parts are hingedly connected to one another via a vertically extending axis when in use, and wherein the at least two furniture parts are configured to be moved by the assembly between the extended position, in which the furniture parts are aligned substantially parallel to one another, and a second position, in which the furniture parts are aligned substantially coplanar to one another.

38. A method for installing and coupling an assembly according to claim 1, the method comprising:

in a preparatory step, arranging the coupling element on and/or in the guide system, in a first installation step, moving the support relative to the guide system, and in a second installation step, automatically coupling the cable of the drive device to the coupling device arranged on the movable furniture part and/or the support.

39. The method according to claim 38, further comprising:

tensioning a force storage device of the drive device during a movement of the support from the extended position towards the retracted position, supporting a movement of the support from the retracted position towards the extended position by an ejection device, and/or maintaining a continuous motion-coupling of the coupling element with the coupling device between the retracted position and the extended position.

40. An assembly for guiding a movable furniture part relative to a furniture body, the assembly comprising:

a guide system to be fastened to the furniture body, a support on which the movable furniture part is to be mounted, and by which the movable furniture part is movable relative to the guide system between a retracted position and an extended position, a drive device configured to move the support relative to the guide system, the drive device including a cable comprising a coupling element, a coupling device configured to be coupled to the coupling element, and a receiving shaft to receive the movable furniture part in the retracted position, wherein the coupling element is arranged on and/or in the guide system for automatic coupling with the coupling device, and wherein the drive device is configured to transmit a preload to the support in a direction toward the extended position via the coupling element to at least assist with movement of the support toward the extended position.

41. An assembly for guiding a movable furniture part relative to a furniture body, the assembly comprising:

a guide system to be fastened to the furniture body, a support on which the movable furniture part is to be mounted, and by which the movable furniture part is movable relative to the guide system between a retracted position and an extended position, a drive device configured to move the support relative to the guide system, the drive device including a cable comprising a coupling element, a coupling device configured to be coupled to the coupling element, and a receiving shaft to receive the movable furniture part in the retracted position, wherein the coupling element is arranged on and/or in the guide system for automatic coupling with the coupling device, wherein the support and the guide system are arranged upon installation to facilitate the automatic coupling of the coupling element with the coupling device via the movement of the support relative to the guide system, and wherein the drive device is configured to transmit a preload to the support in a direction toward the extended position via the coupling element.

* * * * *